US012560546B2

(12) United States Patent
Al-Mallahi et al.

(10) Patent No.: US 12,560,546 B2
(45) Date of Patent: Feb. 24, 2026

(54) SYSTEM, APPARATUS AND METHOD OF NON-DESTRUCTIVELY DETERMINING PETIOLE NUTRIENT VALUES IN NEAR REAL-TIME USING A PORTABLE SPECTROPHOTOMETER

(71) Applicant: Dalhousie University, Halifax (CA)

(72) Inventors: Ahmad Al-Mallahi, Truro (CA); Reem Abukmeil, Truro (CA)

(73) Assignee: Dalhousie University, Halifax (CA)

( * ) Notice: Subject to any disclaimer, the term of this patent is extended or adjusted under 35 U.S.C. 154(b) by 375 days.

(21) Appl. No.: 18/323,490

(22) Filed: May 25, 2023

(65) Prior Publication Data

US 2024/0393254 A1    Nov. 28, 2024

(51) Int. Cl.
G01N 21/84    (2006.01)
G01N 21/31    (2006.01)
G06N 20/00    (2019.01)

(52) U.S. Cl.
CPC ............. G01N 21/84 (2013.01); G01N 21/31 (2013.01); G06N 20/00 (2019.01); *G01N 2021/8466* (2013.01); *G01N 2201/0221* (2013.01)

(58) Field of Classification Search
CPC ........... G01N 2021/8466; G01N 21/31; G01N 21/84; G06N 20/00
See application file for complete search history.

(56) References Cited

U.S. PATENT DOCUMENTS

| | | | |
|---|---|---|---|
| 6,683,970 | B1 | 1/2004 | Satake et al. |
| 9,585,307 | B2 | 3/2017 | Holland |
| 10,175,215 | B2 | 1/2019 | Ozcan et al. |
| 10,261,017 | B2 | 4/2019 | Chittiboyina et al. |
| 10,458,845 | B2 | 10/2019 | Connor |
| 10,664,716 | B2 | 5/2020 | Liu et al. |
| 10,718,665 | B2 | 7/2020 | Edwards et al. |
| 10,789,266 | B2 | 9/2020 | Bhabesh et al. |
| 11,449,652 | B2 | 9/2022 | Gates et al. |
| 11,483,471 | B2 | 10/2022 | Scheiner et al. |

(Continued)

FOREIGN PATENT DOCUMENTS

| | | | | |
|---|---|---|---|---|
| CN | 110567892 | A | * 12/2019 | ............. G01N 21/27 |
| CN | 114509403 | A | 5/2022 | |

(Continued)

OTHER PUBLICATIONS

Menesatti, "Estimation of plant nutritional status by Vis-NIR spectrophotometric analysis on orange leaves [*Citrus sinensis* (L) Osbeck cv Tarocco]", Feb. 20, 2010 (Year: 2010).*

(Continued)

*Primary Examiner* — Maurice C Smith

(74) *Attorney, Agent, or Firm* — SMART & BIGGAR LP

(57) ABSTRACT

A system, an apparatus and a method of non-destructively determining petiole nutrient values in near real-time from plant leaves in a crop field using a portable spectrophotometer are provided. The method may comprise: (a) taking non-destructive spectral measurements of a leaf of a plant in the crop field using the portable spectrophotometer to generate leaf spectral data, (b) storing the leaf spectral data in a memory; (c) computing, by a processor, the petiole nutrient values based on the stored leaf spectral data; and (d) providing a near real-time result indicating the petiole nutrient values.

26 Claims, 5 Drawing Sheets

(56) References Cited

U.S. PATENT DOCUMENTS

| | | | |
|---|---|---|---|
| 11,852,618 | B2 | 12/2023 | Gui et al. |
| 2021/0209490 | A1 | 7/2021 | Casas et al. |
| 2023/0367032 | A1 | 11/2023 | Cisek et al. |

FOREIGN PATENT DOCUMENTS

| | | | | | |
|---|---|---|---|---|---|
| GB | 2588694 | A | * | 5/2021 | .......... H04W 36/302 |
| ID | P202204075 | A | * | 8/2022 | |
| TW | M514621 | U | * | 12/2015 | |
| WO | WO-2017134669 | A1 | * | 8/2017 | ............ B07C 5/342 |
| WO | 2018090142 | A1 | | 5/2018 | |
| WO | 2022219373 | A1 | | 10/2022 | |
| WO | 2023031355 | A1 | | 3/2023 | |

OTHER PUBLICATIONS

Power Cert, "What is a Server? Servers vs Desktops Explained", https://www.youtube.com/watch?v=UjCDWCeHCzY, Feb. 4, 2020 (Year: 2020).*

D. T. Westermann, "Nutrient Concentration Relationships Between the Fourth Petiole and Upper-Stem of Potato Plants", 1994 (Year: 1994).*

Extended European Search Report received in European Application No. 24178090.7, dated Oct. 29, 2024, 10 pages.

Cohen Y et al: "Leaf nitrogen estimation in potato based on spectral data and on simulated bands of the Venus satellite", Precision Agriculture, Kluwer Academic Publishers, BO, vol. 11, No. 5, Nov. 12, 2009 (Nov. 12, 2009), pp. 520-537, XP019828812, ISSN: 1573-1618.

Jongschaap Raymond E E et al: "Spectral measurements at different spatial scales in potato: relating leaf, plant and canopy nitrogen status", International Journal of Applied Earth Observation and Geoinformation, Elsevier, Amsterdam, NL, vol. 5, No. 3, Aug. 6, 2004 (Aug. 6, 2004), pp. 205-218, XP087029361, ISSN: 1569-8432, DOI:10.1016/J.JAG.2004.03.002 [retrieved on Aug. 6, 2004].

Cohen Y et al: "Leaf nitrogen estimation 1,3-6, in potato based on spectral data and, simulated bands of the Venus satellite", 13-15 Precision Agriculture, Kluwer Academic Publishers, BO, vol. 11, No. 5, Nov. 12, 2009 (Nov. 12, 2009), pp. 520-537, XP019828812, ISSN: 1573-1618.

Anderen, Zachary, "Pocketa Officially Launches LENSTM." Nov. 15, 2022. 4 pages.

Trimble, Scott, "The Vast Applications for Spectroscopy in Plant Research." Oct. 14, 2020, https://cid-inc.com/blog/leaf-spectroscopy/, 8 pages.

Aitkenhead, Matt et al., "Phylis: A Low-Cost Portable Visible Range Spectrometer for Soil and Plants." Jan. 7, 2017, Sensors 2017, 17, 99; doi:10.3390/s17010099, 14 pages.

Ge, Y., Atefi, A., Zhang, H. et al. "High-throughput analysis of leaf physiological and chemical traits with VIS-NIR-SWIR spectroscopy: a case study with a maize diversity panel." Jun. 26, 2019, Plant Methods 15, 66 , 2019, https://doi.org/10.1186/s13007-019-0450-8 , 12 pages.

Findlight. "Portable Spectroscopy and How it is Changing Agriculture." FindLight Blog. Sep. 1, 2018. https://www.findlight.net/blog/spectroscopy-precision-agriculture/, 7 pages.

Trimble, Scott, "NIR & Spectroscopy in Agriculture & Crop Science." CID Bio-Science Blog, Oct. 14, 2020, https://cid-inc.com/blog/nir-spectrometer-in-agriculture-crop-science/ , 8 pages.

Guerra, Marcelo B. B. et al., "In situ Determination of K, Ca, S and Si in Fresh Sugar Cane Leaves by Handheld Energy Dispersive X-Ray Fluorescence Spectrometry." J. Braz. Chem. Soc., vol. 29, No. 5, 1086-1093, 2018, http://dx.doi.org/10.21577/0103-5053.20170229 , 8 pages.

CID. "CI-710s SpectraVue Leaf Spectrometer." CID Bio-Science. Retrieved: Apr. 16, 2023. https://cid-inc.com/plant-science-tools/leaf-spectroscopy/ci-710-miniature-leaf-spectrometer/. 8 pages.

Mokhtari, M. H., H. R. et al., "Application of visible and near-infrared spectrophotometry for detecting salinity effects on wheat leaves (*Triticum asativum* L.)." Dec. 2014. Agric Eng Int: CIGR Journal, 16(4): 35-42., 8 pages.

Wang, Tao et al., "SeeFruits: Design and evaluation of a cloud-based ultra-portable NIRS system for sweet cherry quality detection." Computers and Electronics in Agriculture, vol. 152, 2018, pp. 302-313, ISSN 0168-1699, https://doi.org/10.1016/j.compag.2018.07.017, 12 pages.

Abukmeil, Reem & Al-Mallahi, Ahmad "Inter-comparison of in-field and lab visible/near infrared spectral measurements and calibration of spectral patterns taken for potato plant leaves using empirical line method," TS_III_WG_5-01, The XX CIGR World Congress 2022, Dec. 5-9, 2022, Kyoto International Conference Center, Kyoto, Japan, 2 pages.

Abukmeil, Reem et al. New approach to estimate macro and micronutrients in potato plants based on foliar spectral reflectance, Computers and Electronics in Agriculture, vol. 198, 2022, 107074, ISSN 0168-1699, https://doi.org/10.1016/j.compag.2022.107074 , 13 pages.

Abukmeil, Reem &Ahmad Al-Mallahi, "Detecting nutrients in potato plants based on visible/near infrared in-field spectral measurements," Asabe Annual International Meeting, Jul. 17-20, 2022. Asabe Paper No. 2200061, DOI: https://doi.org/10.13031/aim.202200061 , 6 pages.

Abukmeil, Reem & Al-Mallahi, Ahmad, "Developing empirical method to estimate phosphorous in potato plants using spectroscopy-based approach." In Proceedings of the 15th International Conference on Precision Agriculture. Monticello, IL: International Society of Precision Agriculture. Jun. 26-29, 2022. 8 pages.

Steiner, F. et al. Effects of aluminum on plant growth and nutrient uptake in young physic nut plants. Semina: Ciências Agrárias, 2012, 1779-88, vol. 33 (5). https://doi.org/10.5433/1679-0359.2012v33n5p1779.

Xu, K. et al. Radiometric calibration of UAV remote sensing image with spectral angle constraint. Remote Sensing, 2019, 21 pages, vol. 11: 1291. https://doi.org/10.3390/rs11111291.

Xu, Y., & Wang, L. K-Nearest neighbor-based weighted twin support vector regression. Applied Intelligence, 2014, 299-309, vol. 41 (1). https://doi.org/10.1007/s10489-014-0518-0.

Wang, J. et al. Non-destructive evaluation of the leaf nitrogen concentration by in-field visible/near-infrared spectroscopy in pear orchards. Sensors, 2017, 15 pages, vol. 17 (3): 538. https://doi.org/10.3390/s17030538.

Wickham, H. et al. dplyr: A grammar of data manipulation. https://dplyr.tidyverse.org, 2023. https://github.com/tidyverse/dplyr. 2 pages.

Williams, P., Antoniszyn, J., and Manley, M. Near infrared technology: getting the best out of Light. 2019, African Sun Media. http://doi.org/10.18820/9781928480310.

Zhai, Y. et al. Estimation of nitrogen, phosphorus, and potassium contents in the leaves of different plants using laboratory-based visible and near-Infrared reflectance spectroscopy: comparison of partial least-square regression and support vector machine regression methods. International Journal of Remote Sensing, 2013, 2502-18, vol. 34 (7). https://doi.org/10.1080/01431161.2012.746484.

Rauschenberger, A. and Glaab, E. Predicting correlated outcomes from molecular data, Bioinformatics, 37(21), 2021, pp. 3889-3895, Aug. 6, 2021, Oxford University Press. doi: 10.1093/bioinformatics/btab576.

Abbasian, A. et al. Effect of various phosphorus and calcium concentrations on potato seed tuber production. Journal of Plant Nutrition, 2018, 1765-1777, vol. 41 (14). https://doi.org/10.1080/01904167.2018.1454955.

Agriculture and Agri-Food Canada. Potato market information review—2019-2020. 2019 https://www.agr.gc.ca/eng/canadas-agriculture-sectors/horticulture/horticulture-sector-reports/potato-market-information-review-2019-2020/?id=1606246042832 (accessed on Nov. 8, 2021).

Alaoui-Sossé, B. et al. Effect of copper on growth in cucumber plants (*Cucumis sativus*) and its relationships with carbohydrate

(56) References Cited

OTHER PUBLICATIONS accumulation and changes in ion contents. Plant Science, 2004, 1213-1218, vol. 166 (5). Elsevier. https://doi.org/10.1016/j.plantsci.2003.12.032.

Rad A., S. et al. Role of physical and chemical agents in plants for tolerance to boron nutrition. In Boron in Plants and Agriculture. 2022, 147-168. Elsevier. https://doi.org/10.1016/B978-0-323-90857-3.00013-8.

Awad, M. & Khanna, R. Support Vector Regression. In: Efficient Learning Machines. 2015, 67-80. Apress, Berkeley, CA. https://doi.org/10.1007/978-1-4302-5990-9_4.

Botha, E. J., Zebarth, B. J., & Leblon, B. Non-destructive estimation of potato leaf chlorophyll and protein contents from hyperspectral measurements using the Prospect radiative transfer model. Canadian Journal of Plant Science, 2006, 279-291, vol. 86 (1). https://doi.org/10.4141/P05-017.

Breiman, L. Random Forests. Machine Learning, 2001, 5-32, vol. 45. https://doi.org/10.1023/A:1010933404324.

Carter, G.A., & Miller, R.L. Early detection of plant stress by digital imaging within narrow stress-sensitive wavebands. Remote Sensing of Environment, 1994, 295-302, vol. 50 (3). https://doi.org/10.1016/0034-4257(94)90079-5.

Chen, T., & Guestrin, C. XGBoost: A scalable tree boosting system. In proceedings of the 22nd ACM SIGKDD international conference on knowledge discovery and data mining. 2016, 785-794, New York, NY, USA: ACM. https://doi.org/10.1145/2939672.2939785.

Coliban, R.-M. et al. Linear and Non-Linear Models for Remotely-Sensed Hyperspectral Image Visualization. Remote Sensing. 2020, 20 pages, vol. 12 (15): 2479. https://doi.org/10.3390/rs12152479.

Davenport, J.R. et al. Leaf spectral reflectance for nondestructive measurement of plant nutrient status. HortTechnology, 2005, 31-35, 15 (1). https://doi.org/10.21273/HORTTECH.15.1.0031.

Ding, C., & Peng, H. Minimum redundancy feature selection from microarray gene expression data. Journal of bioinformatics and computational biology, 2005, 185-205, vol. 3 (2). https://doi.org/10.1142/S0219720005001004.

Fageria, N.K. et al. Foliar fertilization of crop plants. Journal of Plant Nutrition, 2009, 1044-64, vol. 32 (6). https://doi.org/10.1080/01904160902872826.

Fox, R.L. & Albrecht, W.A. Calcium-boron interaction demonstrated by Lemna minor on clay suspensions. Research Bulletin, 1958, 663. Columbia. Missouri., 15 pages.

Guo, P. et al. Evaluating Calibration and Spectral Variable Selection Methods for Predicting Three Soil Nutrients Using Vis-NIR Spectroscopy. Remote Sensing, 2021, 20 pages, 13 (19): 4000. https://doi.org/10.3390/rs13194000.

Hastie, T., Tibshirani, R., & Friedman, J. The elements of statistical learning: data mining, inference, and prediction. Second edition. 2008, New York: Springer.

Heenan, D.P., & Campbell, L.C. Influence of potassium and manganese on growth and uptake of magnesium by soybeans (Glycine max (L.) Merr. cv. Bragg). Plant Soil, 1981, 447-456, vol. 61. https://doi.org/10.1007/BF02182025.

Herrmann, I., & Berger, K. Remote and proximal assessment of plant traits. Remote Sensing, 2021, 5 pages, vol. 13:1893. https://doi.org/10.3390/rs13101893.

Hernandez, J. et al. Using ridge regression models to estimate grain yield from field spectral data in bread wheat (Triticum aestivum L.) Grown under Three Water Regimes. Remote Sensing, 2015, 2109-26, vol. 7 (2). https://doi.org/10.3390/rs70202109.

Hochmuth, G.J. & Hanlon, E. Plant tissue analysis and interpretation for vegetable crops in Florida. Horticultural Sciences Department, 2018, UF/IFAS Extension, HS964 series. https://edis.ifas.ufl.edu/publication/ep081 (accessed on Jun. 1, 2021).□□.

Jafarbiglu, H., & Pourreza, A. A comprehensive review of remote sensing platforms, sensors, and applications in nut crops. Computers and Electronics in Agriculture, 2022, 23 pages, vol. 197: 106844. https://doi.org/10.1016/j.compag.2022.106844.

Koch, M. et al. The importance of nutrient management for potato production part I: plant nutrition and yield. Potato Research, 2020, 97-119, vol. 63 (1). https://doi.org/10.1007/s11540-019-09431-2.

Krinitskiy, M. et al. On the Generalization Ability of Data-Driven Models in the Problem of Total Cloud Cover Retrieval. Remote Sensing, 2021, 28 pages, vol. 13 (2): 326. https://doi.org/10.3390/rs13020326.

Kumar, S., & Pandey, A.K. Chemistry and biological activities of flavonoids: an overview. The Scientific World Journal, 2013, 1-16. https://doi.org/10.1155/2013/162750.\.

Liao, H. et al. Rapid diagnosis of nutrient elements in fingered citron leaf using near infrared reflectance spectroscopy. Journal of Plant Nutrition, 2012, 1725-34, vol. 35 (11). https://doi.org/10.1080/01904167.2012.698352.

Liu, N. et al. Hyperspectral Imagery to Monitor Crop Nutrient Status within and across Growing Seasons. Remote Sensing of Environment, 2021, 23 pages, vol. 255: 112303. https://doi.org/10.1016/j.rse.2021.112303.\.

Mattila, H. et al. Singlet oxygen, flavonols and photoinhibition in green and senescing silver birch leaves. Trees, 2021, 1267-82, vol. 35 (4). https://doi.org/10.1007/s00468-021-02114-x.

Meyer, D. et al. e1071: Misc Functions of the Department of Statistics, Probability Theory Group (Formerly: E1071), TU Wien. R package version, 2021, 7-9, 1. https://CRAN.R-project.org/package=e1071.

Miao, J. et al. Mapping seasonal leaf nutrients of mangrove with Sentinel-2 images and XGBoost method. Remote Sensing, 2022, 23 pages, 14 (15): 3679. https://doi.org/10.3390/rs14153679.\.

Motsara, M. Guide to laboratory establishment for plant nutrient analysis. Food and agriculture organization of the United Nations, 2008, Rome.□□219 pages.

Muñoz-Huerta, R.F. et al. A review of methods for sensing the nitrogen status in plants: advantages, disadvantages and recent advances. Sensors, 2013, 10823-10843, vol. 13. https://doi.org/10.3390/s130810823.

Muttucumaru, N. et al. Effects of nitrogen and sulfur fertilization on free amino acids, sugars, and acrylamide-forming potential in potato. Journal of Agricultural and Food Chemistry, 2013, 6734-42, 61 (27). https://doi.org/10.1021/jf401570x.

Naumann, M. et al. The importance of nutrient management for potato production part II: plant nutrition and tuber quality. Potato Research, 2020, 121-37, 63 (1). https://doi.org/10.1007/s11540-019-09430-3.

Nigon, T.J. et al. Prediction of early season nitrogen uptake in maize using high-resolution aerial hyperspectral imagery. Remote Sensing, 2020, 23 pages, 12 (8): 1234. https://doi.org/10.3390/rs12081234.

Ortiz, J.D. et al. Intercomparison of approaches to the empirical line method for vicarious hyperspectral reflectance calibration. Frontiers in Marine Science, 2017, 21 pages, vol. 4: 296. https://doi.org/10.3389/fmars.2017.00296.

Osco, L.P. et al. A machine learning framework to predict nutrient content in Valencia-orange leaf hyperspectral measurements. Remote Sensing, 2020, 21 pages, vol. 12 (6): 906. https://doi.org/10.3390/rs12060906.

Peng, Y. et al. Estimation of leaf nutrition status in degraded vegetation based on field survey and hyperspectral data. Scientific Reports, 2020, 12 pages, vol. 10 (1): 4361. https://doi.org/10.1038/s41598-020-61294-7.

Pranato, J., Minasny, B., and Weaver, T. Near infrared (NIR) spectroscopy as a rapid and cost-effective method for nutrient analysis of plant leaf tissues. In Advances in Agronomy, 2020, 1-49, vol. 164. Elsevier. https://doi.org/10.1016/bs.agron.2020.06.001.

Pompilio, L. et al. Application of the empirical line method (ELM) to calibrate the airborne daedalus—CZCS scanner. European Journal of Remote Sensing, 2018, 33-46, vol. 51 (1). https://doi.org/10.1080/22797254.2017.1399087.

R Core Team. R: a language and environment for statistical computing. R Foundation for Statistical Computing, 2021, Vienna, Austria. https://www.R-project.org/.

(56)                    References Cited

OTHER PUBLICATIONS

Rauschenberger, A., & Glaab, E. Predicting correlated outcomes from molecular data. Edited by Jonathan Wren. Bioinformatics, 2021, 3889-95, vol. 37 (21). https://doi.org/10.1093/bioinformatics/btab576.

Rei, S., & Wang, Q. Towards a universal hyperspectral index to assess chlorophyll content in deciduous forests. Remote Sensing, 2017, 19 pages, vol. 9 (3): 191. https://doi.org/10.3390/rs9030191.

Ren, J. et al. Remote Sensing Inversion of Typical Offshore Water Quality Parameter Concentration Based on Improved SVR Algorithm. Remote Sensing, 2023, 19 pages, vol. 15 (8): 2104. https://doi.org/10.3390/rs15082104.

Rowe, R.C. Potato health management: The American Phytopathological Society. 1993, 1-178. APS Press, Minnesota.

Saari, H. et al. Unmanned aerial vehicle (UAV) operated spectral camera system for forest and agriculture applications. Proceedings vol. 8174, Remote Sensing for Agriculture, Ecosystems, 2011, 2 pages, 543 and Hydrology XIII; 81740H. Event: SPIE Remote Sensing, Prague, Czech Republic. https://doi.org/10.1117/12.897585.

Schleuss, P. M. et al. Interactions of nitrogen and phosphorus cycling promote P acquisition and explain synergistic plant-growth responses. Ecology, 2020, 14 pages, vol. 101 (5). https://doi.org/10.1002/ecy.3003.

Schmidt, W., Thomine, S., and Buckhout, T.J. Editorial: iron nutrition and interactions in plants. Frontiers in Plant Science, 2020, 4 pages, vol. 10: 1670. https://doi.org/10.3389/fpls.2019.01670.

Self. J.R. Plant analysis. Colorado State University Extension Fact Sheet No. 0.116. 2014, Fort Collins, Colorado. https://extension.colostate.edu/topic-areas/agriculture/plant-analysis-0-116/ (accessed on Jan. 20, 2022).

Silva, R., Gomes, V., Mendes-Faia, A., and Melo-Pinto, P. Using Support Vector Regression and Hyperspectral Imaging for the Prediction of Oenological Parameters on Different Vintages and Varieties of Wine Grape Berries. Remote Sensing, 2018, 23 pages, vol. 10 (2): 312. https://doi.org/10.3390/rs10020312.

Singh, L. et al. Hyperspectral remote sensing for foliar nutrient detection in forestry: A near-infrared perspective. Remote Sensing Applications: Society and Environment, 2022, 12 pages, vol. 25: 100676. https://doi.org/10.1016/j.rsase.2021.100676.

* cited by examiner

300

Take non-destructive spectral measurements of a leaf of a plant in the crop field using a spectrophotometer to generate leaf spectral data ⟋ 308

Store the leaf spectral data in memory ⟋ 312

Compute the petiole nutrient values based on the stored leaf spectral data ⟋ 316

Provide a near real-time result indicating the petiole nutrient values ⟋ 320

SYSTEM, APPARATUS AND METHOD OF NON-DESTRUCTIVELY DETERMINING PETIOLE NUTRIENT VALUES IN NEAR REAL-TIME USING A PORTABLE SPECTROPHOTOMETER

FIELD

This document relates to systems, apparatus, and methods of non-destructively determining petiole nutrient values in near real-time from plant leaves in a crop field using a portable spectrophotometer.

BACKGROUND

Plants need many nutrients for growth and sustenance. For example, plants may need macronutrients like nitrogen (N), phosphorus (P), potassium (K), calcium (Ca), magnesium (Mg), and sulfur (S) in large quantities. Plants may also need micronutrients like manganese (Mn), zinc (Zn), iron (Fe), sodium (Na), copper (Cu), aluminum (Al), and boron (B) in small quantities.

In agricultural applications, crop yield and/or quality of harvested crops may be affected if the crop plants do not receive a suitable amount of each required nutrient. For example, the crop yield and/or quality may be reduced if the plants do not receive enough nutrients. In some cases, excessive supply of nutrients may also reduce the crop yield and/or quality.

Determining the nutrient value status of plants can enable corrective actions to be performed to improve crop yield and/or quality. For example, the composition and quantity of fertilizer may be tailored for one or more specific nutrients based on the determined nutrient value status of the plants.

SUMMARY

The following summary is provided to introduce the reader to the more detailed discussion to follow. The summary is not intended to limit or define any claimed or as yet unclaimed invention. One or more inventions may reside in any combination or sub-combination of the elements or process steps disclosed in any part of this document including its claims and figures.

According to some aspects, a method of non-destructively determining petiole nutrient values in near real-time from plant leaves in a crop field using a portable spectrophotometer is provided. The method may comprise: (a) taking non-destructive spectral measurements of a leaf of a plant in the crop field using the portable spectrophotometer to generate leaf spectral data, (b) storing the leaf spectral data in a memory; (c) computing, by a processor, the petiole nutrient values based on the stored leaf spectral data; and (d) providing a near real-time result indicating the petiole nutrient values.

According to some aspects, an apparatus for non-destructively determining petiole nutrient values in near real-time from plant leaves in a crop field is provided. The apparatus may comprise: a memory storing a machine learning model trained to provide petiole nutrient value outputs based on leaf spectral data inputs; and at least one processor communicatively coupled with the memory. The at least one processor may be configured to collectively: receive leaf spectral data generated by a portable spectrophotometer based on non-destructive spectral measurements of a leaf of a plant in the crop field; store the leaf spectral data in the memory; input the leaf spectral data into the machine learning model;

receive an output comprising the petiole nutrient values determined by the machine learning model based on the leaf spectral data; and provide a near real-time result to a mobile device, the near real-time result indicating the petiole nutrient values.

According to some aspects, a non-transitory computer-readable medium comprising instructions executable by a processor is provided. The instructions when executed may configure the processor to: receive leaf spectral data generated by a portable spectrophotometer based on non-destructive spectral measurements of a leaf of a plant in a crop field; store the leaf spectral data in a memory; input the leaf spectral data into a machine learning model trained to provide petiole nutrient value outputs based on leaf spectral data inputs; receive an output comprising the petiole nutrient values determined by the machine learning model based on the leaf spectral data; and provide a near real-time result indicating the petiole nutrient values.

According to some aspects, a system for non-destructively determining petiole nutrient values in near real-time from plant leaves in a crop field is provided. The system may comprise a portable spectrophotometer and a remote server. The portable spectrophotometer may be configured to: generate leaf spectral data based on non-destructive spectral measurements of a leaf of a plant in the crop field; and transmit the leaf spectral data for receipt by the remote server via a network. The remote server may comprise a processor and a memory, the memory storing a machine learning model trained to provide petiole nutrient value outputs based on leaf spectral data inputs. The remote server may be configured to: receive the leaf spectral data; store the leaf spectral data in the memory; input the leaf spectral data into the machine learning model; receive the petiole nutrient values determined by the machine learning model based on the leaf spectral data; and provide a near real-time result indicating the petiole nutrient values to a mobile device.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
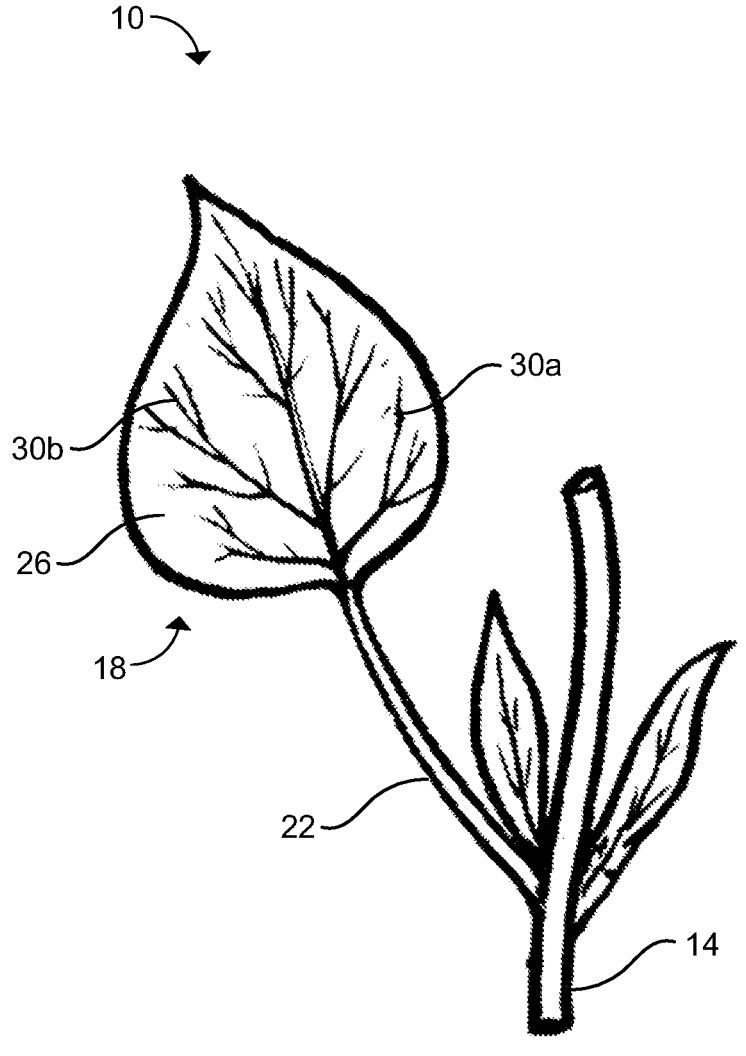
FIG. 1 is an illustration of a leaf of a plant whose nutrient values may be determined, in accordance with an embodiment.

Numerous embodiments are described in this application and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a group of elements are said to 'collectively' perform an act where that act is performed by any one of the elements in the group, or performed cooperatively by two or more (or all) elements in the group.

As used herein and in the claims, a first element is said to be "received" in a second element where at least a portion of the first element is received in the second element unless specifically stated otherwise.

Some elements herein may be identified by a part number, which is composed of a base number followed by an alphabetical or subscript-numerical suffix (e.g., 112a, or 112$_1$). Multiple elements herein may be identified by part numbers that share a base number in common and that differ by their suffixes (e.g., 112$_1$, 112$_2$, and 112$_3$). All elements with a common base number may be referred to collectively or generically using the base number without a suffix (e.g., 112).

As used herein and in the claims, "up", "down", "above", "below", "upwardly", "vertical", "elevation", "upper", "lower" and similar terms are in reference to a directionality generally aligned with (e.g., parallel to) gravity. The terms "distal", "proximal" and similar terms are in reference to a directionality generally that is transverse (e.g., perpendicular) to gravity. However, none of the terms referred to in this paragraph imply any particular alignment between elements. For example, a first element may be said to be "vertically above" a second element, where the first element is at a higher elevation than the second element, and irrespective of whether the first element is vertically aligned with the second element.

Generally, plant tissue tests for determining plant nutrient value status are destructive and do not provide real-time results. For example, a farmer may harvest petioles from plants in a crop field for measurement. The harvested petioles may be shipped to a laboratory for testing. Depending on the testing to be performed, a large number of petioles may need to be destructively removed.

The laboratory may then conduct plant tissue testing and provide petiole nutrient values to the farmer. The process of removing the petioles, shipping, testing, and result notification may take weeks to complete. This delay undermines the effectiveness of any corrective action (e.g. adjusting fertilizer composition and quantity) taken based on the results because the nutrient content in the measured plants may have changed in the intervening period.

The disclosed systems, apparatus and methods can provide non-destructive and near real-time determination of plant nutrient value status using a portable spectrophotometer. Molecules absorb light at frequencies that are characteristic of their structure. The portable spectrophotometer can be used to take non-destructive spectral measurements that indicate the presence and concentration of different molecules (nutrients) in the probed region (e.g., a leaf of a plant). The portable spectrophotometer can generate leaf spectral data (based on the non-destructive spectral measurements) that can be used to determine the nutrient value status of plants. No plant leaves or petioles are required to be removed from the plants for testing. The disclosed system, apparatus and method can provide the plant nutrient value status without destruction of any of the plants used for testing.

Further, the disclosed system, apparatus and method can conduct the analysis and provide the results in near real-time, for example, within 10-20 seconds. This can enable any required corrective actions (based on the determined plant nutrient value status) to be immediately performed. As used herein and in the claims, an action is said to be performed in "near real-time" where that action is performed in less than 1 minute from when it was initiated.

In canopy reflectance measurements, ground-based or air-borne platforms are used to determine the ratio of the amount of light leaving the canopy to the amount of incoming light. The canopy reflectance measurement may be used for calculating the crop nutrient value status. However, canopy reflectance measurements are frequently subject to atmospheric and soil interference. The disclosed system, apparatus and method can use a portable spectrophotometer to probe plant leaves which avoids the atmospheric interference and/or soil interference associated with conducting canopy reflectance measurements using ground-based or air-borne platforms.

Referring now to FIG. 1, shown therein is an illustration of a plant 10 whose nutrient value status may be determined using the disclosed system, apparatus or method. In the illustrated example, plant 10 includes a stem 14, a leaf 18 and a petiole 22 attaching leaf 18 to stem 14. Leaf 18 includes a leaf blade 26 and multiple leaf veins 30.

The surface area of leaf blade 26 can be much larger compared with petiole 22 and therefore spectral reflectance measurements may be taken from leaf blade 26 instead of petiole 22. Accordingly, the measured nutrient values may be indicative of the nutrient values corresponding to the leaf blade instead of the petiole nutrient values.

Nutrient values in petioles are not the same as nutrient values measured at other parts of a plant (e.g. the leaf blade). At present and historically, farmers have sent petiole to laboratories, and the laboratories have returned petiole nutrient values. As such, farmers generally understand what corrective actions are required based on laboratory petiole nutrient values but not based on nutrient values associated with other parts of the plant.

The disclosed system, apparatus and method can take spectral measurements from leaf blades of a plant to produce leaf spectral data and compute petiole nutrient values based on the leaf spectral data. Providing petiole nutrient values (as opposed to nutrient values associated with the leaf) can enable a user to select and apply well known and understood corrective actions.

Figure 2:
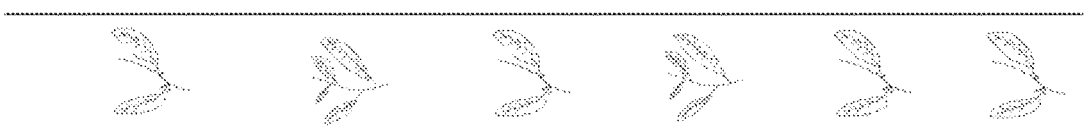
FIG. 2 is a schematic illustration of a system for non-destructively determining petiole nutrient values in near real-time from plant leaves in a crop field, in accordance with an embodiment.

Referring now to FIG. 2, shown therein is a schematic illustration of a system 100 for non-destructively determining petiole nutrient values in near real-time from plant leaves 18 in a crop field 34, in accordance with an embodiment. As shown, system 100 may include a portable spectrophotometer 104 and a remote server 108.

In the illustrated example, portable spectrophotometer 104 and remote server 108 are communicatively coupled using a network 112. Network 112 may include a communication network such as the Internet, a Wide-Area Network (WAN), a Local-Area Network (LAN), or another type of network. In other examples, portable spectrophotometer 104 and remote server 108 may not be connected to a common network and may communicate using intermediary devices and/or communication networks.

Crop field 34 may include multiple plants 10 (e.g., at least 500 plants). Each plant 10 may have one or more leaves 18. Plants 10 may include any suitable plants grown in agricultural applications. For example, plants 10 may include wheat, corn, soy, potato etc. Crop field 34 may be located in open air or inside a greenhouse.

Portable spectrophotometer 104 may have any suitable design that is portable and capable of taking non-destructive spectral measurements of leaves of plants 10. Portable spectrophotometer 104 may be sized and designed to be carried by an operator while the operator uses the portable spectrophotometer to take spectral measurements. For example, portable spectrophotometer 104 may be battery-operated and designed to be carried in a backpack by an operator 38.

A light source within portable spectrophotometer 104 can generate incident light onto a leaf and a detector within portable spectrophotometer 104 can measure the light reflected from leaves of plants 10. Portable spectrophotometer 104 may generate leaf spectral data based on the reflected spectral measurements.

In some embodiments, portable spectrophotometer 104 may take spectral measurements and generate leaf spectral data in visible and/or near-infrared wavelength ranges. For example, portable spectrophotometer 104 may generate leaf spectral data in a wavelength range from 400 nm-2500 nm. In other examples, portable spectrophotometer 104 may generate leaf spectral data in smaller (e.g., 400 nm-2000 nm)

or larger (e.g., 350 nm-2500 nm) wavelength ranges. Smaller wavelength ranges may enable faster completion of the spectral measurements and/or require fewer resources for computing the petiole nutrient values. Larger wavelength ranges may enable determination of the petiole nutrient values with higher accuracy and/or detection of a larger number of nutrients. The wavelength range may be manually or automatically adjusted based on the nutrient values being measured. For example, operator 38 may manually adjust the wavelength range. In other examples, the wavelength range may be automatically adjusted, for example, by remote server 108.

Portable spectrophotometer 104 may take the spectral measurements at discrete wavelength intervals within the measured wavelength range. For example, portable spectrophotometer 104 may take the spectral measurements at 0.5 nm wavelength intervals within the measured wavelength range. The wavelength intervals used during the measurements may be manually or automatically adjusted based on the nutrient values being determined. For example, operator 38 may manually adjust the wavelength interval. In other examples, the wavelength interval may be automatically adjusted, for example, by remote server 108. Different wavelength intervals ranging from 0.1 nm to 10 nm may be used. Smaller wavelength intervals may enable determination of nutrient values with higher accuracy and/or determination of a larger number of nutrients. Larger wavelength intervals may enable faster determination of nutrient values and/or require fewer computing resources for determination of the nutrient values.

In some embodiments, portable spectrophotometer 104 may be a NIRS™ DS2500 Analyzer or an ASD™ FieldSpec 4 spectroradiometer. In other embodiments, portable spectrophotometer 104 may be any other suitable spectrophotometer.

Portable spectrophotometer 104 may be configured to transmit the generated leaf spectral data for receipt by remote server 108. In the illustrated example, portable spectrophotometer 104 may transmit the generated leaf spectral data to remote server 108 via network 112. In other examples, portable spectrophotometer 104 may transmit the generated leaf spectral data to an intermediary device, for example, a mobile device 42 of operator 38. Portable spectrophotometer 104 may transmit the generated leaf spectral data to mobile device 42 using point-to-point communication or a local-area network (e.g. Bluetooth™) and mobile device 42 may then transmit the leaf spectral data to remote server 108 using a large-area network/internet.

Mobile device 42 may be any suitable device that is portable and capable of sending and receiving data over a communication network (e.g., wireless communication networks like cellphone networks and/or wi-fi networks). For example, mobile device 42 may be a laptop, a tablet device, or a smartphone with wireless communication capabilities. Mobile device 42 may be a dedicated companion device designed for use with portable spectrophotometer 104. In some embodiments, mobile device 42 may be a general-purpose device that includes proprietary software for communication with portable spectrophotometer 104 and/or analysis of data received from portable spectrophotometer 104. In some embodiments, the functionality of portable spectrophotometer 104 and mobile device 42 may be provided by a single device.

In the illustrated example, remote server 108 includes a processor 116 and a memory 120. Processor 116 may control the operation of remote server 108. Processor 116 may be any suitable processor, controller or digital signal processor that can provide sufficient processing power depending on the configuration, purposes and requirements of system 100, as is known by those skilled in the art. For example, processor 116 may be a high-performance general processor. For example, processor 116 may include a standard processor, such as an Intel® processor, or an AMD® processor. Alternatively, processor 116 may include more than one processor with each processor being configured to perform different dedicated tasks. Alternatively, specialized hardware (e.g., graphical processing units (GPUs)) can be used provide some of the functions provided by processor 116.

Memory 120 may include one or more of random-access memory (RAM), read-only memory (ROM), a hard drive, and a flash memory (e.g. solid state drive). Remote server 108 may store received leaf spectral data in memory 120. For example, remote server 108 may receive leaf spectral data generated by portable spectrophotometer 104 and store the received leaf spectral data in memory 120.

Memory 120 may also store a machine learning model trained to provide petiole nutrient value outputs based on leaf spectral data inputs. The machine learning model may be generated and trained by remote server 108. In some embodiments, remote server 108 may receive a machine learning model generated by an external device. Remote server 108 may train the received machine learning model and store the trained machine learning model in memory 120. In other embodiments, the trained machine learning model may be received by remote server 108 from an external device. Remote server 108 may store the received trained machine learning model in memory 120.

The leaf spectral data inputs provided to the machine learning model may include, for example, leaf spectral data generated by portable spectrophotometer 104 by taking spectral measurements from leaf blades of plants. The petiole nutrient value outputs provided by the machine learning model may include, for example, determined petiole nutrient values for one or more nutrients such as N, P, K, Ca, Mg, S, Mn, Zn, Fe, B, Cu, Al, and Na. The petiole nutrient values for the different nutrients may be expressed as percentage values (of total mass), g/kg, and/or parts per million (ppm).

The machine learning model may be any suitable machine learning model based on the input data to be analyzed, the output data requirements, the available training data and/or available computing resources. In some embodiments, the machine learning model may be a multiple linear regression (MLR) model. Lasso subset selection methods may be performed for the MLR model to generate a lasso regression model. In other embodiments, the machine learning model may be a different model, for example, a polynomial regression model.

The training data for the machine learning model may be generated by taking spectral measurements of plants (e.g., reflectance spectral measurements from leaf blade portions) and generating leaf spectral data that act as predictors (x) for the machine learning model. Corresponding petioles of the plants may be removed and used for laboratory tissue analysis. The laboratory tissue analysis results of the petioles can act as responses (y) for the machine learning model. Models of correlation may be built between the responses (y) and the predictors (x). Equation (1) below, provides an example of a MLR model using correlation coefficients $\beta_i$:

$$y = \beta + \sum_{i=1}^{Z_i} x_i \beta_i \qquad \text{Equation (1)}$$

The number of predictors (x) being larger than the number of responses (y) can result in over-fitting of the MLR model. The accuracy of the MLR model may be improved by using subset selection methods to select a subset of the predictors. In some embodiments, lasso MLR modelling may be used as the subset selection method. In other embodiments, other subset selection methods like stepwise subset selection or Bayesian model averaging may be used.

Lasso MLR modelling may be used to identify the most informative, least redundant predictors (wavelengths) using a complexity parameter ($\lambda$) that controls the amount of shrinkage: the larger that the value of $\lambda$ is, the greater can be the penalization of the non-zero coefficients in the model, and consequently a greater shrinkage can be imposed on coefficient values. A lasso regression model may be generated by selecting the value of $\lambda$ that minimizes the root mean squared error (RMSE). The chosen $\lambda$ parameter can determine the number of coefficients that will compose the lasso regression model, which are selected as the ones with the greatest explanatory power in relation to the target predictor. Model training and performance assessment may be conducted, for example, using 5-fold cross validation, with the value of $\lambda$ chosen based on the smallest RMSE. Table 1 below shows values for number, range, and first four significant wavebands resulting from Lasso MLR modelling of different elements for example leaf spectral data obtained from potato plants.

TABLE 1

Values for number, range, and first four significant wavebands resulting from Lasso MLR modelling of different elements for example leaf spectral data obtained from potato plants.

| Element | Number of bands | Range of bands (nm) | First four significant wavebands (nm) |
| --- | --- | --- | --- |
| N | 13 | 404-1828 | 660, 684, 404, 484 |
| P | 10 | 404-1924 | 708, 404, 540, 700 |
| K | 17 | 404-2300 | 404, 428, 588, 948 |
| Ca | 20 | 404-2100 | 404, 444, 588, 540 |
| Mg | 14 | 404-1940 | 700, 532, 1716, 524 |
| S | 18 | 404-1916 | 404, 588, 516, 1452 |
| Mn | 22 | 428-2492 | 660, 628, 428, 492 |
| Zn | 12 | 468-2124 | 1932, 524, 1852, 532 |
| Fe | 19 | 404-2316 | 1932, 636, 524, 2308 |
| B | 11 | 412-1932 | 684, 1932, 412, 460 |
| Cu | 23 | 428-2484 | 1940, 676, 428, 1716 |
| Al | 17 | 404-2316 | 1932, 2308, 524, 652 |
| Na | 20 | 548-2148 | 548, 972, 700, 1028 |

Processor 116 may input the received leaf spectral data (e.g., from portable spectrophotometer 104) and/or stored leaf spectral data (e.g., in memory 120) into the trained machine learning model. The machine learning model can determine petiole nutrient values based on the leaf spectral data. For example, the machine learning model can determine petiole nutrient values for N, P, K, Ca, Mg, S, Mn, Zn, Fe, B, Cu, Al, and Na based on leaf spectral data generated by taking spectral measurements of leaf blades of potato plants. Processor 116 may receive the petiole nutrient values determined by the machine learning model.

Processor 116 can provide a near real-time result indicating the petiole nutrient values to a mobile device. For example, processor 116 may provide the near real-time result to mobile device 42 of operator 38. For example, processor 116 may provide the near real-time results to mobile device 42 less than 1 minute (e.g., within 0.01 to 30 seconds) from when the portable spectrophotometer sent the spectral measurements. This may enable operator 38 to non-destructively collect near real-time results indicating petiole nutrient values from multiple plants in a crop field.

Figure 3:
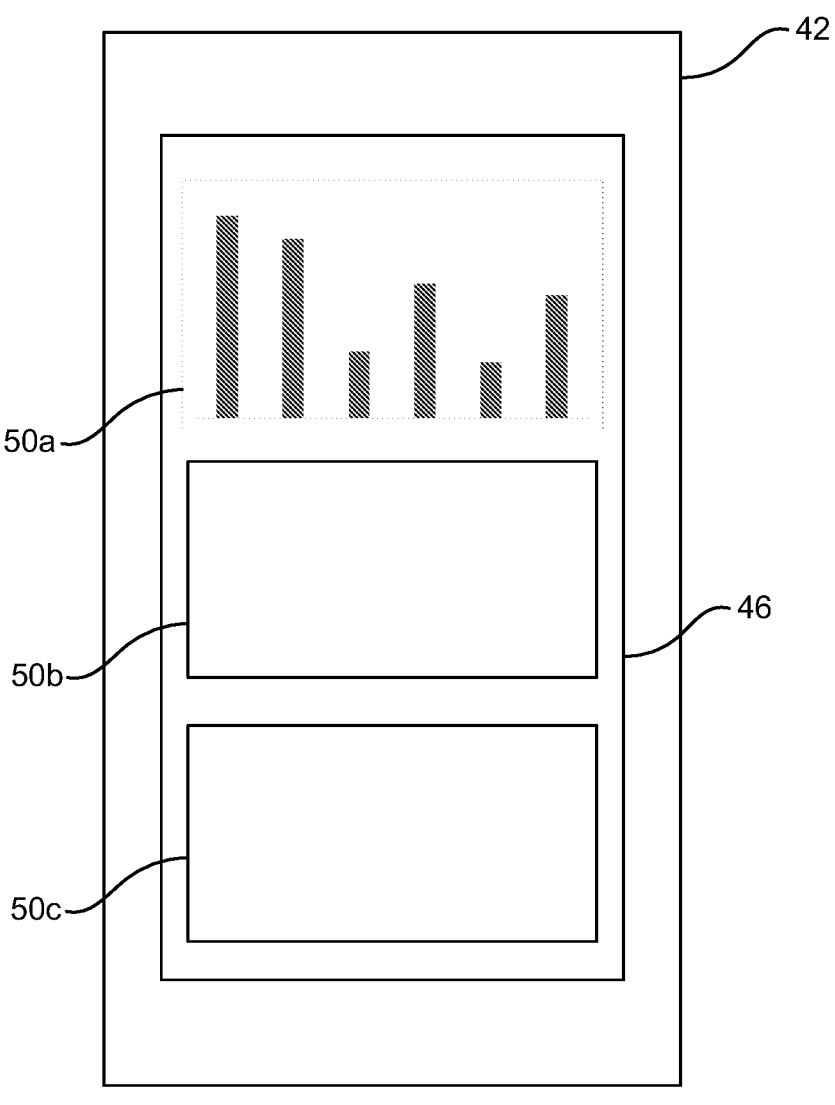
FIG. 3 is a schematic illustration of a result indicating petiole nutrient values provided by the system of FIG. 2 and graphically displayed on a mobile device.

Reference is now made to FIGS. 2 and 3. FIG. 3, shows a schematic illustration of a result indicating petiole nutrient values provided by system 100 and graphically displayed on mobile device 42. Mobile device 42 may include a touch-screen display 46 that provides an interactive display to operator 38. Touchscreen display 46 may provide multiple display portions 50a-50c. For example, display portion 50a may provide a graphical display of the determined petiole nutrient values. In the illustrated example, display portion 50a provides bar graphs displaying determined petiole nutrient values for six nutrients. In other embodiments, display 46 may not be configured to detect touch inputs.

Display portion 50b may provide additional information regarding the determined petiole nutrient values, for example, number of leaf spectral measurements taken, confidence levels associated with the determined petiole nutrient values etc. Display portion 50c may provide recommended corrective actions based on the determined petiole nutrient values. In some examples, one or more of display portions 50 may include other information unrelated to the results indicating the petiole nutrient values.

Figure 4:
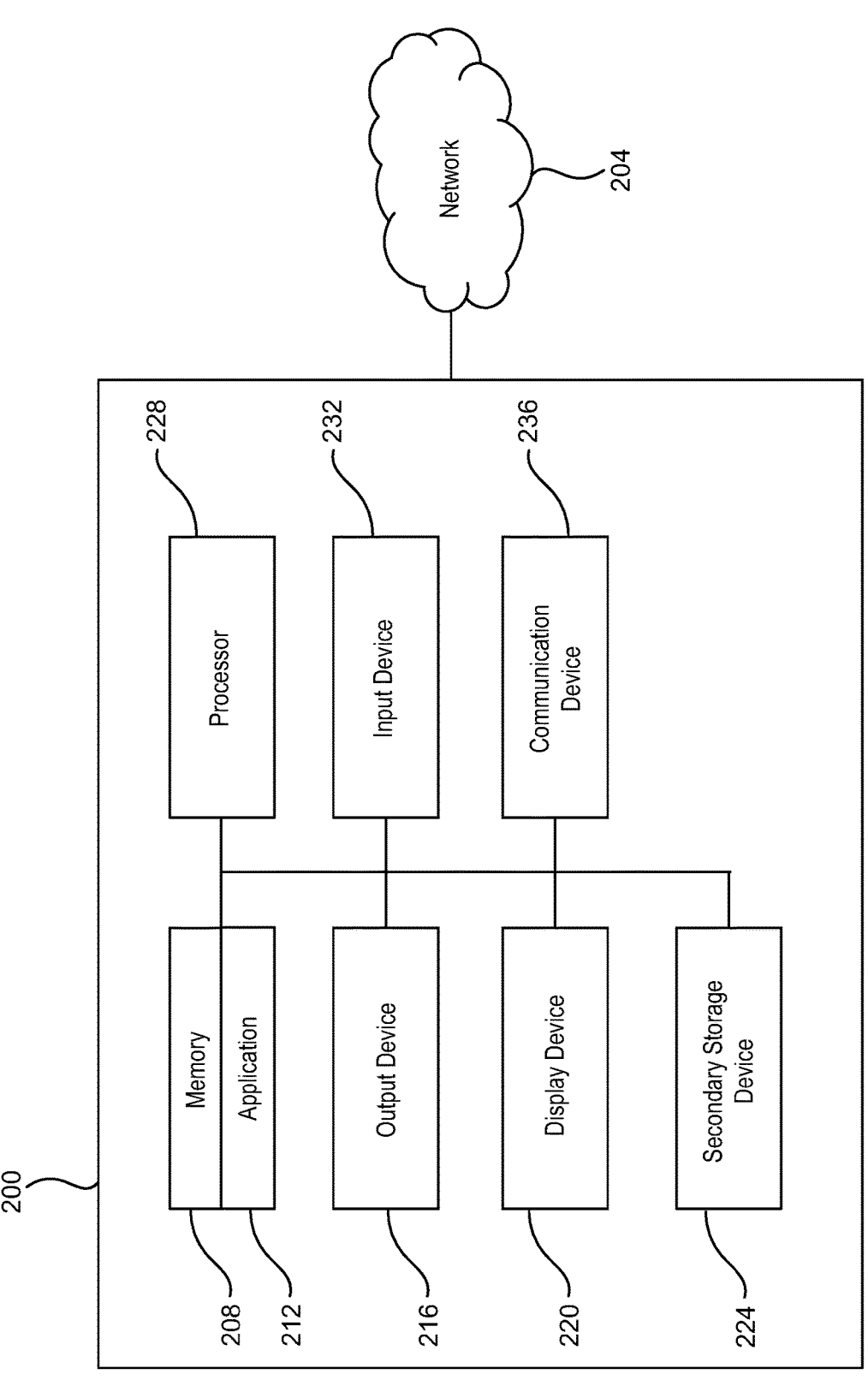
FIG. 4 is a schematic illustration of an apparatus for non-destructively determining petiole nutrient values in near real-time from plant leaves in a crop field, in accordance with an embodiment.

Referring now to FIG. 4, shown therein is a schematic illustration of an apparatus 200 for non-destructively determining petiole nutrient values in near real-time from plant leaves in a crop field. In some embodiments, apparatus 200 may be implemented as a server device (e.g., remote server 108 shown in FIG. 2). In other embodiments, apparatus 200 may be implemented using any other suitable hardware components. For example, apparatus 200 may be implemented as mobile device 42 (FIGS. 2 and 3), integrated with portable spectrophotometer 104 (FIG. 2), or implemented as a companion apparatus usable with portable spectrophotometer 104 (FIG. 2).

For the example embodiment illustrated in FIG. 4, apparatus 200 includes a memory 208, an application 212, an output device 216, a display device 220, a secondary storage device 224, a processor 228, an input device 232, and a communication device 236. One or more (or all) of memory 208, application 212, output device 216, display device 220, secondary storage device 224, processor 228, input device 232, and communication device 236 may be communicatively coupled by wire and/or wirelessly.

In some embodiments, apparatus 200 includes multiple of any one or more of memory 208, application 212, output device 216, display device 220, secondary storage device 224, processor 228, input device 232, and communication device 236. In some embodiments, apparatus 200 does not include one or more of applications 212, secondary storage devices 224, network connections, input devices 232, output devices 216, display devices 220, and communication devices 236.

In at least one embodiment, apparatus 200 includes a connection with a network 204 such as a wired or wireless connection to the Internet or to a private network. In some cases, network 204 includes other types of computer or telecommunication networks. Apparatus 200 may receive, over network 204, leaf spectra data generated by a portable spectrophotometer (e.g., portable spectrophotometer 104 of FIG. 2) based on non-destructive spectral measurements of a leaf of a plant (e.g., a potato plant) in the crop field (e.g., crop field 34 of FIG. 2).

In some embodiments, apparatus 200 may receive the leaf spectral data directly from the portable spectrophotometer by wire or wirelessly. In other embodiments, apparatus 200 may receive the leaf spectral data generated by the portable spectrophotometer from an intermediary device (e.g., mobile device 42 of FIG. 2).

Memory 208 can include one or more of random-access memory (RAM) and read-only memory (ROM). In some embodiments, memory 208 stores one or more applications 212 for execution by processor 228. Applications 212 correspond with software modules including computer executable instructions to perform processing for the functions and methods described herein.

Memory 208 may store a machine learning model trained to provide petiole nutrient value outputs based on leaf spectral data inputs. The machine learning model may be generated and trained by apparatus 200. In some embodiments, apparatus 200 may receive a generated machine learning model from an external device (e.g., over network 204) and may train the received machine learning model. In some embodiments, apparatus 200 may receive a trained machine learning model from an external device (e.g., over network 204) and store the trained machine learning model in memory 208. The machine learning model may be any suitable model, e.g., a lasso regression model.

In some embodiments, memory 208 may also store received leaf spectral data, determined petiole nutrient values, and/or results derived from the petiole nutrient values (e.g. a graphical representation of the petiole nutrient values). The stored data may be retrieved by a user for historical data analysis.

Secondary storage device 224 may include any suitable non-transitory computer-readable medium including instructions executable by a processor (e.g., processor 228). For example, secondary storage device 224 can include a hard drive, floppy drive, CD drive, DVD drive, Blu-ray drive, solid state drive, flash memory or other types of non-volatile data storage. Processor 228 may execute instructions included on secondary storage device 224 to perform processing for the functions and methods described herein.

In some embodiments, apparatus 200 stores information in a remote storage device, such as cloud storage, accessible across a network, such as network 204 or another network. In some embodiments, apparatus 200 stores information distributed across multiple storage devices, such as memory 208 and secondary storage device 224 (i.e., each of the multiple storage devices stores a portion of the information and collectively the multiple storage devices store all of the information). Accordingly, storing data on a storage device as used herein and in the claims, means storing that data in a local storage device, storing that data in a remote storage device, or storing that data distributed across multiple storage devices, each of which can be local or remote.

Input device 232 can include any device for entering information into apparatus 200. For example, input device 232 can be a keyboard, keypad, cursor-device, touchscreen, camera, or microphone. Input device 232 can also include input ports and wireless radios (e.g., Bluetooth®, or 802.11x) for making wired and wireless connections to external devices.

Display device 220 can include any type of device for presenting visual information. For example, display device 220 can be a computer monitor, a flat-screen display, a projector or a display panel.

Output device 216 can include any type of device for presenting a hard copy of information, such as a printer for example. Output device 216 can also include other types of output devices such as speakers, for example. In at least one embodiment, output device 216 includes one or more of output ports and wireless radios (e.g., Bluetooth®, or 802.11x) for making wired and wireless connections to external devices.

Communication device 236 can have any design suitable to receive analog and/or digital inputs from, and to provide analog and/or digital outputs. In some embodiments, communication device 236 may include separate modules for analog and digital signals.

Processor 228 may be any device that can execute applications, computer readable instructions or programs. The applications, computer readable instructions or programs can be stored in memory 208 or in secondary storage device 224, or can be received from remote storage accessible through network 204, for example. Processor 228 may be a high-performance general processor, a standard processor (e.g., an Intel® processor or an AMD® processor), specialized hardware (e.g., GPUs), or multiple processing devices that collectively perform the functions provided by processor 228.

Processor 228 may input leaf spectral data (e.g., leaf spectral data stored in memory 208) into a trained machine learning model (e.g., trained machine learning model stored in memory 208). The machine learning model can determine petiole nutrient values based on the leaf spectral data. Processor 228 may receive an output from the machine learning model that includes the petiole nutrient values determined by the machine learning model.

In some embodiments, processor 228 can provide a near real-time result indicating the petiole nutrient values to a mobile device (e.g., mobile device 42 of FIG. 2). The petiole nutrient values may be graphically displayed on the mobile device. In other embodiments, processor 228 may provide the results to display device 220 and the petiole nutrient values may be graphically displayed on display device 220.

FIG. 4 illustrates one example hardware schematic of an apparatus 200. In alternative embodiments, apparatus 200 contains fewer, additional or different components. In addition, although aspects of an implementation of apparatus 200 are described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. For example, apparatus 200 may include a non-transitory computer readable medium storing computer-readable instructions that when executed by processor 228, configure processor 228 to perform method(s) described herein.

Figure 5:
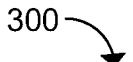
FIG. 5 is a flowchart illustrating an example method of non-destructively determining petiole nutrient values in near real-time from plant leaves in a crop field using a portable spectrophotometer.
Figure 5:
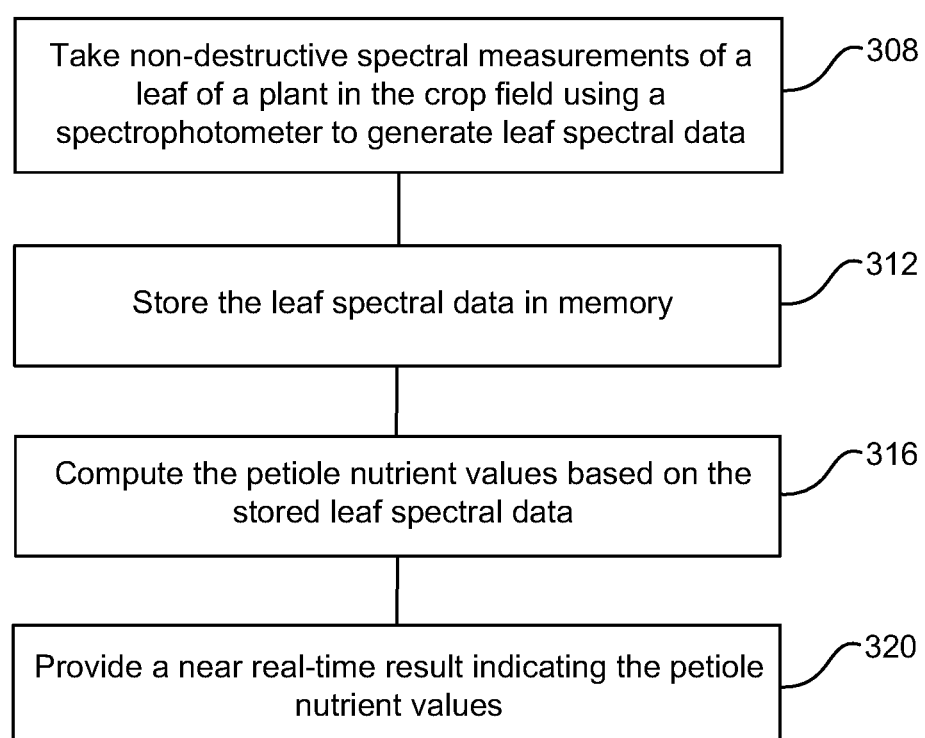

Referring now to FIG. 5, shown therein is a flowchart illustrating an example method 300 of non-destructively determining petiole nutrient values in near real-time from plant leaves in a crop field using a portable spectrophotometer. Method 300 may be performed, for example, using system 100 (FIG. 2) or apparatus 200 (FIG. 4) and reference is also made below to FIGS. 2 and 4.

Method 300 may be performed while carrying the portable spectrophotometer in the crop field. For example, portable spectrophotometer 104 may be carried in crop field 34 on a person or vehicle.

At 308, non-destructive spectral measurements may be taken of a leaf of a plant in the crop field using the carried spectrophotometer to generate leaf spectral data. For example, non-destructive spectral measurements may be taken of a leaf of a potato plant using portable spectrophotometer 104. Portable spectrophotometer 104 can generate leaf spectral data based on the spectral measurements.

At 312, the leaf spectral data may be stored in a memory. In some embodiments, the generated leaf spectral data may be sent to a remote server over a network and stored in a memory of the remote server. For example, portable spectrophotometer 104 may send the generated leaf spectral data to remote server 108 over network 112 and remote server 108 may store the leaf spectral data in memory 120.

In other embodiments, the generated leaf spectral data may be sent to a mobile device and the mobile device may send the leaf spectral data to a remote server over a network. The leaf spectral data may be stored in a memory of the remote server. For example, portable spectrophotometer 104 may send the generated leaf spectral data to mobile device 42 and mobile device 42 may send the leaf spectral data to remote server 108 over network 112. Remote server 108 may store the leaf spectral data in memory 120.

At 316, a processor may compute the petiole nutrient values based on the stored leaf spectral data. The processor may compute the petiole nutrient values by inputting the leaf spectral data into a machine learning model trained to provide petiole nutrient value outputs based on leaf spectral data inputs. In response, the machine learning model may output the petiole nutrient values to the processor. For example, processor 116 (or processor 228) may input the leaf spectral data into a trained machine learning model stored in memory 120 (or memory 208). The machine learning model may be a lasso regression model.

At 320, a near real-time result indicating the petiole nutrient values may be provided. In some embodiments, the near real-time result may be provided by sending the petiole nutrient values to a mobile device. The petiole nutrient values may then be graphically displayed on the mobile device. For example, remote server 108 or apparatus 200 may provide the near real-time result by sending the petiole nutrient values to mobile device 42. Mobile device 42 may graphically display the petiole nutrient values.

In some embodiments, method 300 may proceed to 308 if there are additional leaves for measurement. For example, method 300 may loop through 308 to 320 for at least five other plant leaves in the crop field within ten minutes. This may enable near real-time results to be obtained indicating the petiole nutrient values corresponding to non-destructive spectral measurements from multiple leaves in a short time period. In turn this will allow the farm to contemporaneously react to the returned petiole nutrient values (e.g., by adjusting the composition and/or quantity of fertilizer) before the nutrient content of the measured plants has had time to change. This may improve the effectiveness of the corrective actions, whereby the crop yield and/or quantity may be improved.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

ITEMS

Item 1: A method of non-destructively determining petiole nutrient values in near real-time from plant leaves in a crop field using a portable spectrophotometer, the method comprising: (a) taking non-destructive spectral measurements of a leaf of a plant in the crop field using the portable spectrophotometer to generate leaf spectral data, (b) storing the leaf spectral data in a memory; (c) computing, by a processor, the petiole nutrient values based on the stored leaf spectral data; and (d) providing a near real-time result indicating the petiole nutrient values.

Item 2: The method of any preceding item, wherein said providing comprises sending the petiole nutrient values to a mobile device.

Item 3: The method of any preceding item, wherein said providing further comprises graphically displaying the petiole nutrient values on the mobile device.

Item 4: The method of any preceding item, wherein said storing comprises sending the leaf spectral data to a remote server over a network, wherein the remote server comprises the memory and the processor.

Item 5: The method of any preceding item, wherein said storing comprises a mobile device receiving the leaf spectral data and the mobile device sending the leaf spectral data over a network to a remote server, wherein the remote server comprises the memory and the processor.

Item 6: The method of any preceding item, wherein said providing comprises sending the petiole nutrient values from the remote server to the mobile device and graphically displaying the petiole nutrient values on the mobile device.

Item 7: The method of any preceding item, further comprising repeating steps (a) to (d) for at least five other plant leaves in the crop field within ten minutes.

Item 8: The method of any preceding item, wherein the plant is a potato plant.

Item 9: The method of any preceding item, wherein said computing comprises inputting the leaf spectral data into a machine learning model trained to provide petiole nutrient value outputs based on leaf spectral data inputs, the machine learning model outputting the petiole nutrient values.

Item 10: The method of any preceding item, wherein the machine learning model is a lasso regression model.

Item 11: An apparatus for non-destructively determining petiole nutrient values in near real-time from plant leaves in a crop field, the apparatus comprising: a memory storing a machine learning model trained to provide petiole nutrient value outputs based on leaf spectral data inputs; and at least one processor communicatively coupled with the memory, the at least one processor configured to collectively: receive leaf spectral data generated by a portable spectrophotometer based on non-destructive spectral measurements of a leaf of a plant in the crop field; store the leaf spectral data in the memory; input the leaf spectral data into the machine learning model; receive an output comprising the petiole nutrient values determined by the machine learning model based on the leaf spectral data; and provide a near real-time result to a mobile device, the near real-time result indicating the petiole nutrient values.

Item 12: The apparatus of any preceding item, wherein the petiole nutrient values are graphically displayed on the mobile device.

Item 13: The apparatus of any preceding item, wherein the leaf spectral data generated by the portable spectrophotometer is received over a network from the mobile device.

Item 14: The apparatus of any preceding item, wherein the plant is a potato plant.

Item 15: The apparatus of any preceding item, wherein the machine learning model is a lasso regression model.

Item 16: The apparatus of any preceding item, wherein the memory comprises one or more of random-access memory (RAM), read-only memory (ROM), a hard drive, and a flash memory.

Item 17: A non-transitory computer-readable medium comprising instructions executable by a processor, wherein the instructions when executed configure the processor to: receive leaf spectral data generated by a portable spectrophotometer based on non-destructive spectral measurements of a leaf of a plant in a crop field; store the leaf spectral data in a memory; input the leaf spectral data into a machine learning model trained to provide petiole nutrient value outputs based on leaf spectral data inputs; receive an output comprising the petiole nutrient values determined by the machine learning model based on the leaf spectral data; and provide a near real-time result indicating the petiole nutrient values.

Item 18: The non-transitory computer-readable medium of any preceding item, wherein the leaf spectral data generated by the portable spectrophotometer is received over a network from a mobile device.

Item 19: The non-transitory computer-readable medium of any preceding item, wherein the plant is a potato plant.

Item 20: The non-transitory computer-readable medium of any preceding item, wherein the machine learning model is a lasso regression model.

Item 21: The non-transitory computer-readable medium of any preceding item, wherein the memory comprises one or more of random-access memory (RAM), read-only memory (ROM), a hard drive, and a flash memory.

Item 22: A system for non-destructively determining petiole nutrient values in near real-time from plant leaves in a crop field, the system comprising: a portable spectrophotometer configured to: generate leaf spectral data based on non-destructive spectral measurements of a leaf of a plant in the crop field; and transmit the leaf spectral data for receipt by a remote server via a network; and the remote server comprising a processor and a memory, the memory storing a machine learning model trained to provide petiole nutrient value outputs based on leaf spectral data inputs, the remote server configured to: receive the leaf spectral data; store the leaf spectral data in the memory; input the leaf spectral data into the machine learning model; receive the petiole nutrient values determined by the machine learning model based on the leaf spectral data; and provide a near real-time result indicating the petiole nutrient values to a mobile device.

Item 23: The system of any preceding item, wherein the petiole nutrient values are graphically displayed on the mobile device.

Item 24: The system of any preceding item, wherein the portable spectrophotometer is configured to transmit the leaf spectral data to the mobile device and the mobile device transmits the leaf spectral data to the remote server.

Item 25: The system of any preceding item, wherein the plant is a potato plant.

Item 26: The system of any preceding item, wherein the machine learning model is a lasso regression model.

Item 27: The system of any preceding item, wherein the memory comprises one or more of random-access memory (RAM), read-only memory (ROM), a hard drive, and a flash memory.

We claim:

1. A method of non-destructively determining petiole nutrient values in near real-time from plant leaves in a crop field using a portable spectrophotometer, the method comprising:

(a) taking non-destructive spectral measurements of a leaf of a plant in the crop field using the portable spectrophotometer to generate leaf spectral data, (b) storing the leaf spectral data in a memory;

(c) computing, by a processor, the petiole nutrient values based on the stored leaf spectral data by inputting the leaf spectral data into a machine learning model trained to provide petiole nutrient value outputs based on leaf spectral data inputs, the machine learning model outputting the petiole nutrient values; and (d) providing a near real-time result indicating the petiole nutrient values.

2. The method of claim 1, wherein said providing comprises sending the petiole nutrient values to a mobile device.

3. The method of claim 2, wherein said providing further comprises graphically displaying the petiole nutrient values on the mobile device.

4. The method of claim 1, wherein said storing comprises sending the leaf spectral data to a remote server over a network, wherein the remote server comprises the memory and the processor.

5. The method of claim 1, wherein said storing comprises a mobile device receiving the leaf spectral data and the mobile device sending the leaf spectral data over a network to a remote server, wherein the remote server comprises the memory and the processor.

6. The method of claim 5, wherein said providing comprises sending the petiole nutrient values from the remote server to the mobile device and graphically displaying the petiole nutrient values on the mobile device.

7. The method of claim 1, further comprising repeating steps (a) to (d) for at least five other plant leaves in the crop field within ten minutes.

8. The method of claim 1, wherein the plant is a potato plant.

9. The method of claim 1, wherein the machine learning model is a lasso regression model.

10. An apparatus for non-destructively determining petiole nutrient values in near real-time from plant leaves in a crop field, the apparatus comprising:

a memory storing a machine learning model trained to provide petiole nutrient value outputs based on leaf spectral data inputs; and at least one processor communicatively coupled with the memory, the at least one processor configured to collectively:

receive leaf spectral data generated by a portable spectrophotometer based on non-destructive spectral measurements of a leaf of a plant in the crop field;

store the leaf spectral data in the memory;

input the leaf spectral data into the machine learning model;

receive an output comprising the petiole nutrient values determined by the machine learning model based on the leaf spectral data; and provide a near real-time result to a mobile device, the near real-time result indicating the petiole nutrient values.

11. The apparatus of claim 10, wherein the petiole nutrient values are graphically displayed on the mobile device.

12. The apparatus of claim 10, wherein the leaf spectral data generated by the portable spectrophotometer is received over a network from the mobile device.

13. The apparatus of claim 10, wherein the plant is a potato plant.

14. The apparatus of claim 10, wherein the machine learning model is a lasso regression model.

15. The apparatus of claim 10, wherein the memory comprises one or more of random-access memory (RAM), read-only memory (ROM), a hard drive, and a flash memory.

16. A non-transitory computer-readable medium comprising instructions executable by a processor, wherein the instructions when executed configure the processor to:

receive leaf spectral data generated by a portable spectrophotometer based on non-destructive spectral measurements of a leaf of a plant in a crop field;

store the leaf spectral data in a memory;

input the leaf spectral data into a machine learning model trained to provide petiole nutrient value outputs based on leaf spectral data inputs;

receive an output comprising the petiole nutrient values determined by the machine learning model based on the leaf spectral data; and provide a near real-time result indicating the petiole nutrient values.

17. The non-transitory computer-readable medium of claim 16, wherein the leaf spectral data generated by the portable spectrophotometer is received over a network from a mobile device.

18. The non-transitory computer-readable medium of claim 16, wherein the plant is a potato plant.

19. The non-transitory computer-readable medium of claim 16, wherein the machine learning model is a lasso regression model.

20. The non-transitory computer-readable medium of claim 16, wherein the memory comprises one or more of random-access memory (RAM), read-only memory (ROM), a hard drive, and a flash memory.

21. A system for non-destructively determining petiole nutrient values in near real-time from plant leaves in a crop field, the system comprising:

a portable spectrophotometer configured to:

generate leaf spectral data based on non-destructive spectral measurements of a leaf of a plant in the crop field; and transmit the leaf spectral data for receipt by a remote server via a network; and the remote server comprising a processor and a memory, the memory storing a machine learning model trained to provide petiole nutrient value outputs based on leaf spectral data inputs, the remote server configured to:

receive the leaf spectral data;

store the leaf spectral data in the memory;

input the leaf spectral data into the machine learning model;

receive the petiole nutrient values determined by the machine learning model based on the leaf spectral data; and provide a near real-time result indicating the petiole nutrient values to a mobile device.

22. The system of claim 21, wherein the petiole nutrient values are graphically displayed on the mobile device.

23. The system of claim 21, wherein the portable spectrophotometer is configured to transmit the leaf spectral data to the mobile device and the mobile device transmits the leaf spectral data to the remote server.

24. The system of claim 21, wherein the plant is a potato plant.

25. The system of claim 21, wherein the machine learning model is a lasso regression model.

26. The system of claim 21, wherein the memory comprises one or more of random-access memory (RAM), read-only memory (ROM), a hard drive, and a flash memory.

* * * * *